Sept. 1, 1970  L. C. SMITH  3,526,443

DISPLAY STAND

Filed May 1, 1967  3 Sheets-Sheet 1

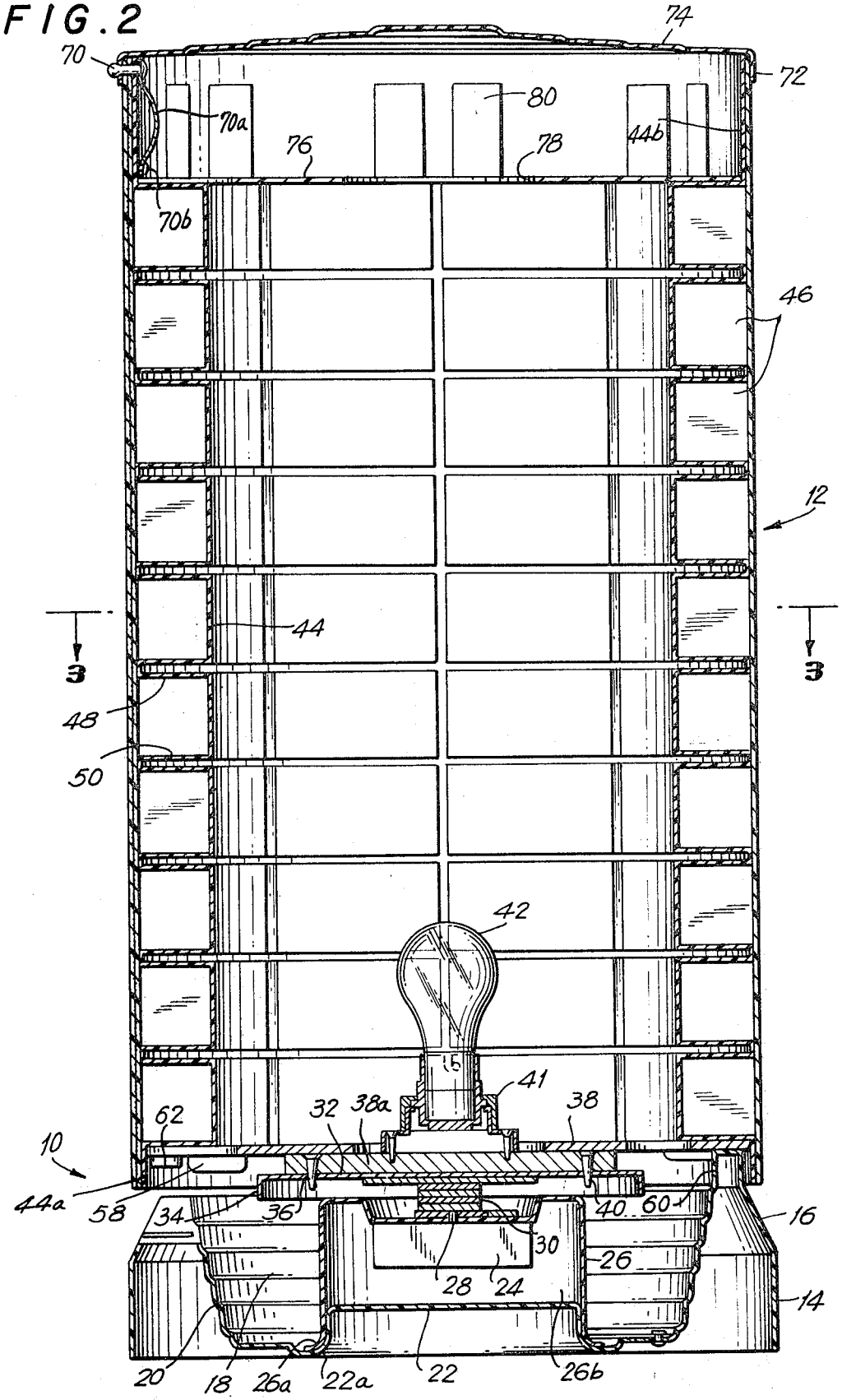

Sept. 1, 1970        L. C. SMITH        3,526,443
DISPLAY STAND
Filed May 1, 1967        3 Sheets-Sheet 3
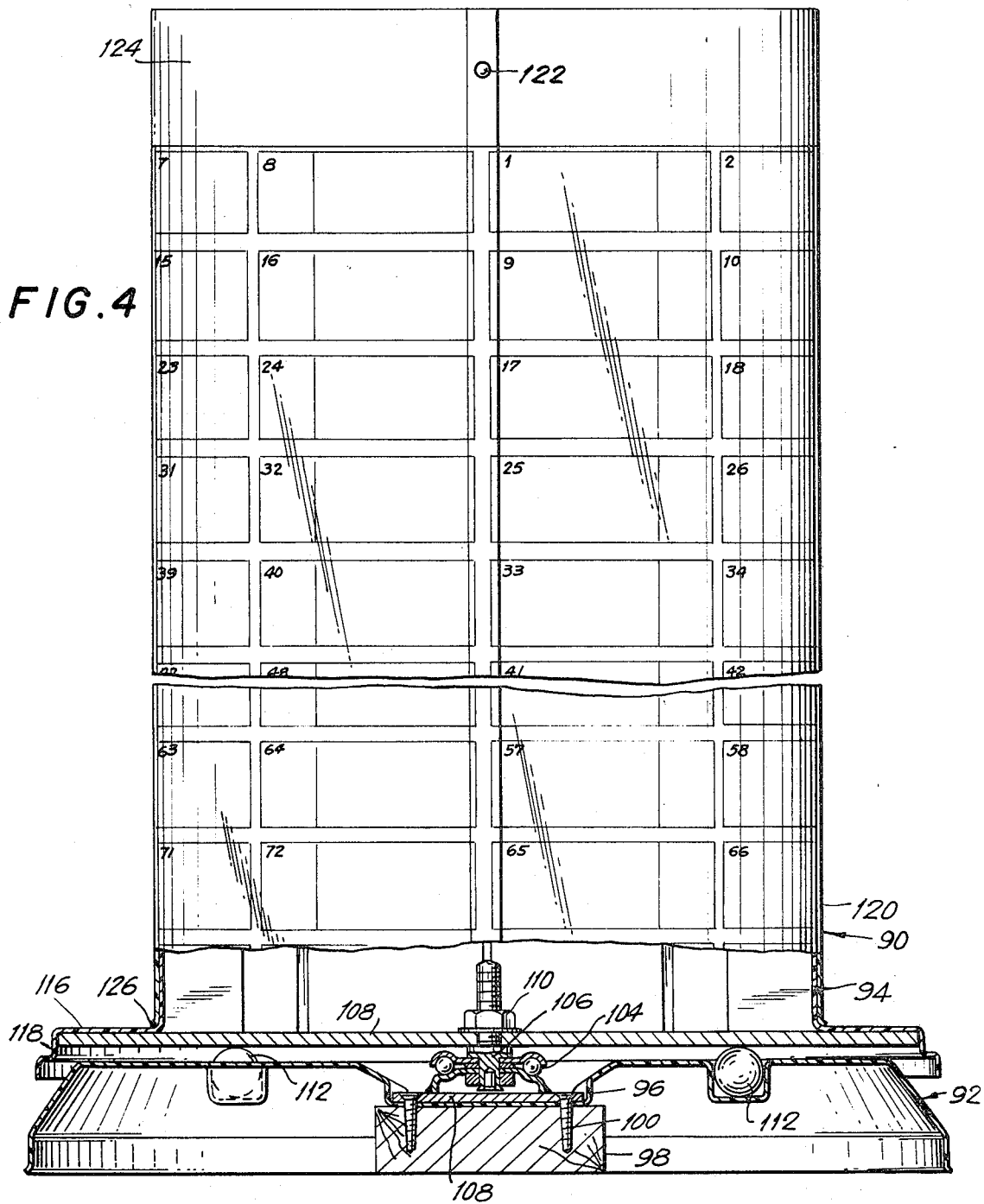
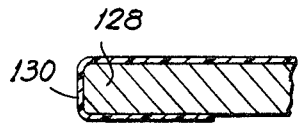
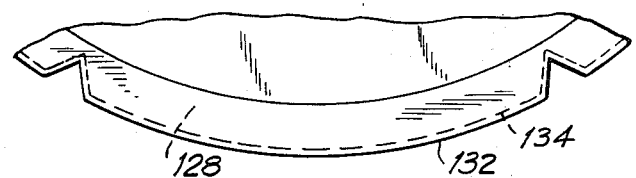

United States Patent Office 3,526,443
Patented Sept. 1, 1970

3,526,443
DISPLAY STAND
Leslie Charles Smith, Winchmore Hill, London, England, assignor to Lesney Products & Co. Limited, London, England
Filed May 1, 1967, Ser. No. 635,061
Int. Cl. A47f 3/06, 3/10
U.S. Cl. 312—125                                           12 Claims

ABSTRACT OF THE DISCLOSURE

According to one embodiment, an easily assembled rotatable display stand is provided for objects which are accommodated in separate receptacles. The display stand is formed from a flat sheet which is rolled into a cylinder which is encircled by a rolled transparent sheet the ends of which are held together, the display portion being rotatably mounted on a support and driven by a motor. According to another embodiment, the display portion is manually rotatable.

DRAWING

FIG. 2 is a cross-section, on enlarged scale, through line 2—2 of FIG. 1;

FIG. 4 is a side view partly in cross-section of a second manually operated embodiment of the invention;

FIG. 5 is a cross-sectional view showing a variation of a detail of the construction of FIG. 4; and FIG. 6 is a top view of the detail of FIG. 5.

DETAILED DESCRIPTION

Figure 1:
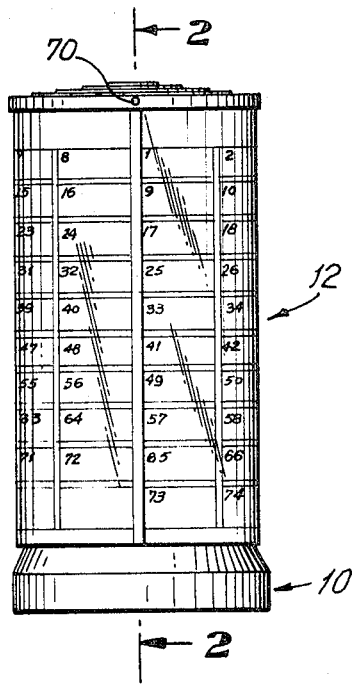
FIG. 1 is a side view of an electrically driven display stand in accordance with one embodiment of the invention.

This invention relates to display stands.

It is one object of the invention to provide an improved construction for a display stand such that the latter can be readily assembled.

It is another object of the invention to provide an improved display stand which is extremely economical to manufacture.

Still another object of the invention is to provide a display stand which can be readily assembled at the place where the display stand is to be used.

In achieving the above and other of its objectives, there is contemplated in accordance with the invention the provision of a display stand which comprises means defining a plurality of receptacles opening outwards, for example, from a central axis and a support which supports the aforesaid means for rotation concentric with said axis.

The aforesaid means will include, in accordance with a preferred embodiment of the invention, a generally cylindrical translucent wall defining the aforesaid receptacles and an optional light source which is encircled by the above-noted wall and which diffuses light throughout the wall. The receptacles in the preferred embodiment will have generally trapezoidal cross-sections and will be arranged in vertical rows equidistantly spaced about the above-noted axis.

In accordance with one feature of the invention, there is provided a transparent cylindrical sheath encircling the afore-noted translucent wall and closing the above-noted receptacles. This transparent sheath may have indicia thereon corresponding to the receptacles and adapted for identifying objects accommodated within the same. The sheath although preferably connected to the wall is preferably a separate and distinct component therefrom.

The transparent cylindrical sheath may be constituted by a rolled sheet having overlapping ends, in which event there will be provided fastening means for holding these overlapping ends together. In a preferred arrangement, there may be provided a closure which fits atop the aforesaid wall and through which the above-noted fastening means extends in order to hold the overlapping ends of the transparent sheath together.

According to a further optional feature of the invention, a motor may be provided for rotating the translucent wall relative to the supporting base. Moreover, the motor may be mounted on the supporting base, in which event a horizontal floor will be connected to a vertical shaft comprised by the motor. The translucent wall may include bottom flanges cupping around the periphery of this floor. The motor may provide for reverse rotation.

In accordance with a further feature of the invention the wall may be constituted by a flat wall which is then rolled into cylindrical form, there being provided fastening means to fasten together the abutting ends of the rolled wall. In an alternative embodiment, this wall may consist of arcuate segments.

According to a still further feature of the invention, there may be provided a rigid structure between the shaft of the motor and the above-noted floor, this rigid structure including a disc with apertures therein, the floor including plugs for detachable engagement with the disc.

In accordance with still a further feature of the invention, the above-noted support may be provided with a central hollow in which it includes an upward protrusion, there being further provided a stand which supports the above-noted motor and encircles the protrusion in order to exactly locate the motor.

The above and other objects and features of the invention will be better understood from the following detailed description which refers to the accompanying drawing, the figures of which have been generally described hereinabove.

Figure 3:
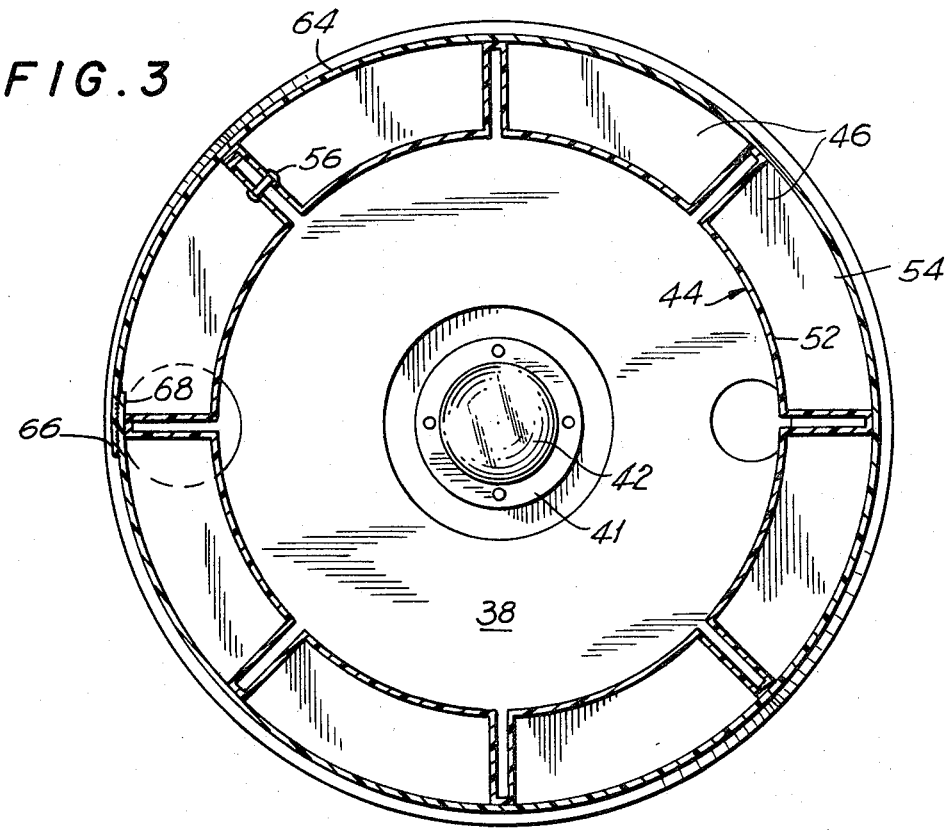
FIG. 3 is a cross-section through line 3—3 of FIG. 2.

The display stand illustrated in FIGS. 1–3 comprises a support 10 and a display section 12. The support 10 may be fabricated of plastic or metal and comprises a generally cylindrical outer wall 14 atop from which extends a conical section 16. The support has a central hollow section generally indicated at 18 and defined by a ribbed inner wall 20 to which is connected a central protrusion 22 of generally smaller cross-section.

An electric motor 24 is mounted on a cylindrical frame 26 which encircles the protrusion 22 and thus serves to locate the motor 24 as well as to hold the same firmly in position. Frame 26 includes a foot section 26a which is accommodated in a corresponding fillet section 22a of the central protrusion.

Frame 26 is substantially taller than protrusion 22 and thus defines therewith a chamber 26b in which is accommodated the motor 24. This motor includes a rotatable shaft 28 which extends vertically through a rigid wooden structure 30 for connection to a rotatable disc 32 having depending flanges 34. The disc is provided with plurality of openings 36.

Atop the disc 32 is provided a wooden or plastic floor 38 having a base 38a and also having depending plugs 40 which are detachably engageable in the aforesaid openings 36. Plugs 40 and be replaced by screws or other such fastening devices.

An electrical connection or socket 41 is mounted atop the floor 38 and serves to accommodate a bulb 42 constituting a source of light, the use of which will become apparent hereinafter.

The display section 12 comprises a translucent wall 44 fabricated of plastic or the like. The wall 44 is provided with a plurality of receptacles 46. These receptacles have a generally trapezoidal cross-section in the plane illustrated in FIG. 3 which plane is perpendicular to the axis of rotation of the shaft 28 which constitutes also the central axis of symmetry of the overall structure. Each of the receptacles 46 has an upper ceiling 48, a lower floor 50, an inner wall 52 and an opening 54 which is directed radially outwards from the central axis of symmetry of the structure. The wall 44, in accordance with one feature of the invention, is originally fabricated from a flat sheet of plastic or the like and is rolled into a generally cylindrical form. Its abutting ends are held together by means of a fastening member such as indicated at 56.

The wall 44 rests on the floor 38 by means of the floors of the lowermost receptacles and includes a depending skirt 44a extending below the floor 38. This skirt is provided with a plurality of inwardly directed protrusions 58 which trap floor 38 against the bottommost receptacles. The flexibility of the material of wall 44 will enable floor 38 to be snapped into position, and the firmness of the straddling grip will enable wall 44 to partake of the rotation of floor 38 and thereby of disc 32.

Motor 24 may be a self-reversing motor of conventional type which when brought to a halt will reverse its direction of rotation. Supplementing this, one or more vertically extending stops 60 may be formed integrally in conical section 14 in intercepting relation with a block 62 suspended from floor 38 and rotatable with the latter. In this arrangement, when block 62 strikes against stop 60, the rotation of motor 24 is halted and a reversal of the direction of rotation follows so that the display portion oscillates back and forth.

Encircling the display portion is a transparent cylindrical sheath 64 fashioned from a flat sheet of transparent plastic which is rolled into cylindrical form thereby to have overlapping ends 66 and 68. These ends may be held together by an adhesive or rivets, but in addition there will be provided a fastening means 70 (see FIG. 1) which passes through the overlapping ends and as well passes through the depending flange 72 of a closure or top cap member 74 resting on top of an upper cylindrical extension 44b of the translucent wall 44. Fastening means 70 which is pressed through openings provided for the purpose may be mounted on a strap 70a riveted at 70b to extension 44b. Said fastening means will operate to suspend sheath 64.

As is illustrated more particularly in FIG. 1, the cylindrical sheath 64 may be provided with a plurality of indicia, each corresponding to one of the receptacles 46 to serve the purpose of identifying the same and/or identifying the objects displayed within the respective receptacles.

Finally, a cardboard disc 76 or the like having a central opening 78 for ventilation can be snapped into position between the ceilings of the uppermost receptacles and inwardly extending protrusions 80 provided for this purpose.

The display stand of the invention provided as above is admirably suited for displaying such items as toys (for example, miniature automotive vehicles), cosmetics, eyeglasses, and so forth.

The display stand of the invention can be readily shipped in knocked-down condition, whereafter the wall 44 can be rolled into a cylinder and mounted on the floor 38 with great convenience. The transparent sheath 64 may be readily rolled from a flat sheet and placed in encircling relationship on the wall 44, the wall 44 and the sheath 64 being held in cylindrical shape by the fastening means referred to hereinabove.

The wall 44, being translucent, will diffuse in very pleasing manner the light generated by the light source 42 and the entire display section may be continuously rotated or oscillated by the motor 24.

It will be appreciated that the structure which has been described hereinabove can be readily fabricated by the use of mass production techniques and that such structure will be a very economical structure both from the viewpoint of production and from the viewpoint of assembly.

In FIG. 4 is illustrated a second embodiment of the invention which is manually rotated. This embodiment includes a display portion 90 and a support 92. The display portion may include a one-piece wall 94 which is provided with the aforenoted receptacles. Alternatively, the wall may be fabricated of a plurality of arcuate sections fastened together by staples.

Support 92 includes a depression 96 from which is suspended a supporting block 98 by means of screws 100 passing through plate 102. A ball bearing 104 is mounted on said plate and rotatably supports a spindle 106 to which a rotatable floor 108 is connected by means of nut 110. Floor 108 is additionally supported by balls 112 universally rotatable in depressions 114. These balls may be replaced by rollers.

From the lower end of wall 94, a flange 116 extends radially outwards. This flange sits on floor 108 with which it rotates due to friction. A skirt depends from flange 116 and operates to center wall 94 on floor 108 while concealing the edge of the latter.

The receptacles in wall 94 are again covered by a transparent sheath shown at 120 and the overlapping edges of which are connected as at 122 to each other and to a cap 124 seated atop wall 94. Sheath 120 rests at its bottom edge 126 on flange 116.

A variation of the flange 116 which is of annular construction appears in FIGS. 5 and 6 wherein the edge 128 of floor 108 is shown embraced by a C-shaped flange 130 located at the bottom of wall 94. Fange 130 may also be annular but may also be formed as trapezoidal segments 132 engaging corresponding scallops 134 in edge 128. This more positively assures engagement between the wall and rotating floor.

In this last construction, indicia may be provided on the sheath 120 to identify the various receptacles or the contents thereof. Brand names or the like may be readily accommodated in the vicinity of cap 124. The entire construction can be readily assembled in situ and the display section is easily rotated relative to the base.

It should be noted that the constructions of FIGS. 4–6 can be optionally provided with a central light source and/or a rotating motor.

In general, while the display wall which provides the receptacles is preferably fabricated of a single generally flat translucent plastic sheet, it is as noted above possible to employ a plurality of arcuate segments which are held together by staples or eyelets or the like. The inner walls of the receptacles may be flat or arcuate, while the floors thereof are generally flat or shaped to accommodate the particular objects involved.

It is also preferred that the display portions of the devices of the invention be readily detachable from their supports or bases and that the display portions be flat or flattenable for shipping or storage. Preferably, but not necessarily, all of the major parts of the above display devices are made of plastic for purposes of economy and appearance while at the same time providing strength at a relatively low weight.

There will now be obvious to those skilled in the art many modifications and variations of the structure set forth hereinabove. These modifications and variations will not, however, depart from the scope of the invention if defined by the following claims.

What is claimed is:
1. A display stand comprising means defining a plurality of receptacles opening outwards from a central axis, a support supporting said means for rotation on said axis, said means comprises a generally cylindrical wall provided with said receptacles, a transparent cylindrical sheath encircling said wall and closing said receptacles, said sheath having indicia thereon corresponding to said receptacles and comprising a rolled sheet having overlapping ends, a closure atop said wall and a fasten- ing means extending through said ends and closure to retain said sheath in cylindrical form.

2. A stand as claimed in claim 1, wherein said means includes a generally cylindrical translucent wall defining said receptacles and a light source encircled by said wall and diffusing light through the wall.

3. A stand as claimed in claim 1, wherein said receptacles have generally trapezoidal cross-sections.

4. A stand as claimed in claim 3, wherein said receptacles are arranged in vertical rows equidistantly spaced about said axis.

5. A stand as claimed in claim 1, wherein the fastening means includes a member insertable through said ends and closure and a strap supported on said wall and holding said member.

6. A stand as claim in claim 1, wherein said wall is a rolled wall having abutting ends, comprising fastening means to fasten the abutting ends together.

7. A display stand comprising means defining a plurality of receptacles opening outwards from a central axis, a support supporting said means for rotation on said axis, a motor for rotating said means relative to said support, said motor being mounted on said support and including a vertical shaft coaxial with said central axis, a longitudinal floor mounted on and rotatable with said shaft, said means being a closed wall including bottom flanges cupping around the periphery of said floor, and a rigid structure between said shaft and floor, said rigid structure including a disc with apertures therein, said floor including means for detachable engagement with said disc.

8. A stand as claimed in claim 7, wherein said support is provided with a central hollow and includes an upward protrusion located in said hollow, comprising a stand supporting said motor and encircling said protrusion.

9. A display stand comprising means defining a plurality of receptacles opening outwards from a central axis, a support supporting said means for rotation on said axis, said means being a wall having a plurality of generally trapezoidal receptacles, said support including a floor supporting said wall and a roller bearing supporting said floor, said support being provided with at least one depression, and a ball in the depression further supporting the floor, said wall including a flange cupping around the periphery of the floor.

10. A stand as claimed in claim 9, wherein the flange and floor respectively have interengaged trapezoidal segments and peripheral scallops.

11. A stand as claimed in claim 7, wherein the motor is self-reversing upon being stopped, comprising engageable stop means on said support and the first said means which engage on rotation of the first said means.

12. A stand as claimed in claim 1, wherein said support includes a rotatable floor and said means is a generally cylindrical wall including protrusions which with at least one of the receptacles straddles said floor.

References Cited

UNITED STATES PATENTS

| | | | |
|---|---|---|---|
| 1,426,844 | 8/1922 | Wood | 312—125 X |
| 2,199,196 | 4/1940 | Evans | 312—125 X |
| 2,345,147 | 3/1944 | Petracca | 108—20 |
| 2,898,171 | 8/1959 | Ehlert et al. | 312—117 X |

CASMIR A. NUNBERG, Primary Examiner

U.S. Cl. X.R.

312—135